United States Patent [19]
Bienert

[11] 3,853,371
[45] Dec. 10, 1974

[54] PIVOT SUPPORT FOR WIND DEFLECTORS ON AUTOMOBILE ROOFS

[75] Inventor: Horst Bienert, Gauting, Germany

[73] Assignee: Webasto-Werk W. Baier KG, Stockdorf/Munich, Germany

[22] Filed: May 21, 1973

[21] Appl. No.: 362,281

[30] Foreign Application Priority Data
May 20, 1972 Germany............................ 2224879

[52] U.S. Cl. ............................. 296/137 R, 16/169
[51] Int. Cl. ............................................. B60j 7/00
[58] Field of Search .......... 16/169, 136, DIG. 13, 2; 312/341 NR; 296/137 F, 137 R

[56] References Cited
UNITED STATES PATENTS
| | | | |
|---|---|---|---|
| 3,156,175 | 11/1964 | Werner | 296/137 R |
| 3,710,419 | 1/1973 | De Groft | 16/169 |

Primary Examiner—Allen N. Knowles
Attorney, Agent, or Firm—Joseph A. Geiger

[57] ABSTRACT

A pivot support for the arms of a pivotable wind deflector where the pivot pin is rotatable inside the spaced ears of the fork-shaped rear portion of the arms, the pivot block of resilient material having a slot through which the pivot pin can be snapped into clamping engagement in the bore of the block.

5 Claims, 4 Drawing Figures

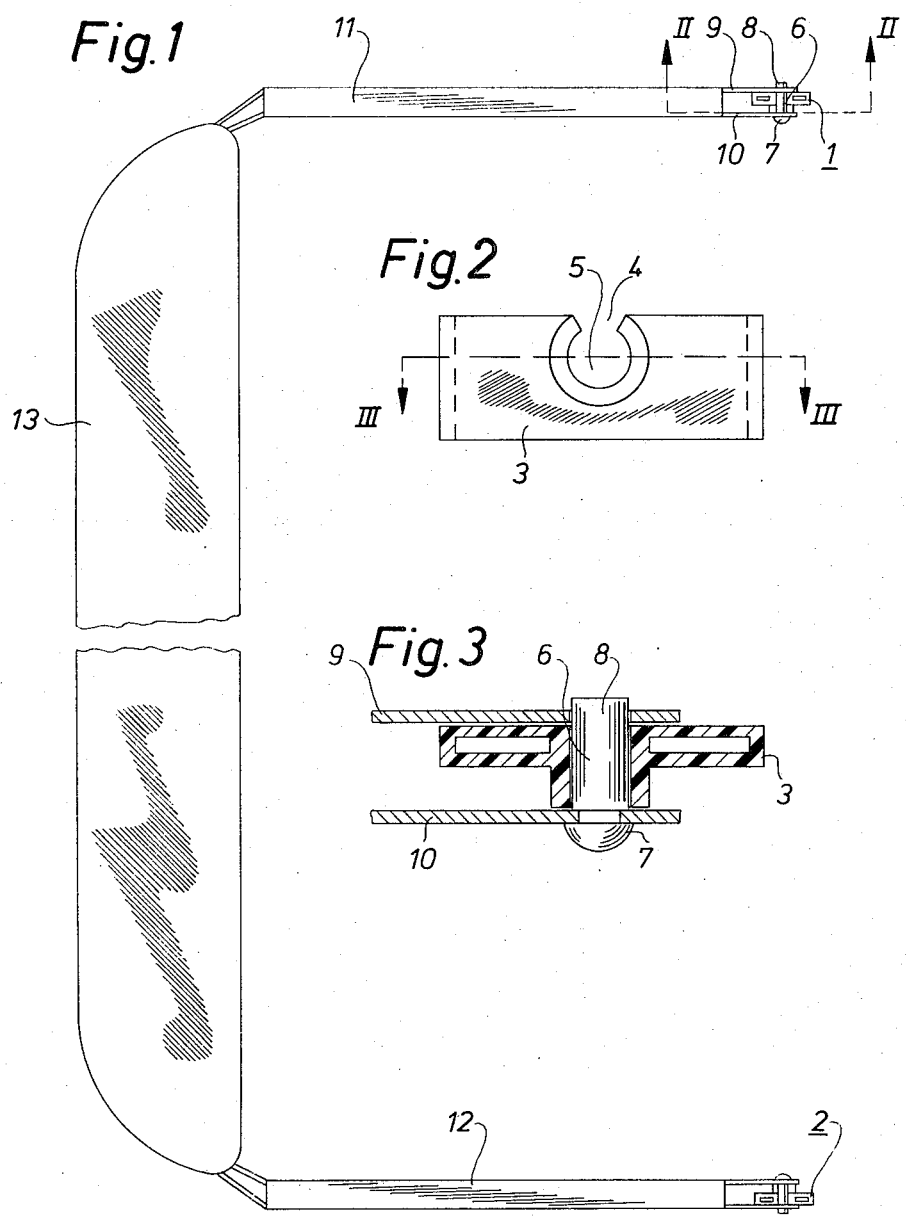

PIVOT SUPPORT FOR WIND DEFLECTORS ON AUTOMOBILE ROOFS

BACKGROUND OF THE INVENTION

1. Field of the Invention

The present invention relates to pivot supports, and in particular to pivot supports for wind deflectors which are mounted on automobile roofs, especially those provided with a so-called sliding roof.

2. Description of the Prior Art

Pivotable wind deflectors are known in the prior art, their pivot supports being commonly provided by means of pivot pins attached to the sheet metal parts of the lateral arms of the wind deflector. This kind of prior art solution requires a comparatively difficult mounting procedure, because the cooperating pivot blocks are in most cases mounted inside the rain channel of the sliding roof opening. This makes the pivot supports inaccessible, except from above the roof. An additional shortcoming of these prior art solutions is their short bearing surface, with their resultant tendency to tilt and to jam or, with sufficient clearance, to create rattling noises.

SUMMARY OF THE INVENTION

It is a primary objective of the present invention to overcome the aforementioned shortcomings by providing a simple support for a pivotable wind deflector which is very easy to assemble and to install and which offers enhanced operational reliability.

The invention proposes to attain the above objective by suggesting a pivot support which includes a pivot block of moderately resilient material, preferably plastic. This pivot block has a longitudinal bore for the support of a cooperating pivot pin, the wall of the pivot block including a slit over its entire length whose width is somewhat smaller than the diameter of the pivot pin to allow the latter to be forcibly snapped into the bore of the pivot block and to be retained therein by the resiliency of the latter.

In a preferred embodiment of the invention the diameter of the pivot pin and of the pivot block bore are so coordinated that the pin, after having been snapped into the pivot bore, is firmly retained therein against rotation. In this case the pivot pin is longer than the pivot block, and the protruding portion of the pin serves as a bearing support for a sheet metal part of the wind deflector which includes a cooperating bearing bore. In contrast to a pivot arrangement where the pivot pin is rotating with the wind deflector, the proposed arrangement greatly facilitates the manufacture in terms of necessary manufacturing tolerances. The possible disadvantage of a short bearing surface in this type of proposed pivot, as compared to a rotating pivot pin, can be overcome in accordance with a further suggestion of the invention, by providing protruding pin portions on both sides of the pivot block, each serving as a bearing support for cooperating sheet metal portions of the wind deflector which in this case has the shape of a fork or U-profile reaching over the pivot block.

It is, of course, also possible to arrange the pivot pin and pivot block in such a way that the pin is rotatable inside the block after assembly, in which case the pin may be fixedly attached to the rear portion of the wind deflector.

In a particularly simple embodiment of the invention the pivot support for the wind deflector is so arranged that each of its two arms has a fork-shaped rear portion in which it carries a rotatable pivot pin which can be snapped into a corresponding pivot block.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows:

FIG. 1 shows in a plane view a wind deflector for an automobile, its two arms being supported by pivot supports embodying the invention;

FIG. 2 shows in an enlarged elevational cross section, taken along line II—II of FIG. 1, a pivot block of the invention;

FIG. 3 shows in a similarly enlarged cross section along line III—III of FIG. 2 a complete pivot support and FIG. 4 is similar to FIG. 3, showing a modified embodiment of the invention.

DESCRIPTION OF THE PREFERRED EMBODIMENT

As can be seen from the figures of the drawing, each of the two pivot supports 1 and 2 includes a pivot block 3 which has a central bore 5 with a vertically oriented narrower slot 4, through which a pivot pin 6 can be forcibly engaged into the bore 5, as shown in FIG. 2. The same figure also shows that the pivot pin 6 includes protruding end portions 7 and 8 on which are rotatably supported the ears 9 and 10 of the fork-shaped rear portion of the arm 11 of the wind deflector. The second arm 12 of the latter has a similar pivot arrangement.

The wind deflector consists of the arms 11 and 12 and of a deflector panel 13, its operational function being not further relevant to this disclosure. This assembly can be mounted in a most simple manner, as shown in FIG. 4, by merely snapping the pivot pins which are carried in the rear portions 9 and 10 of the arms 11 and 12 into the corresponding pivot blocks. The support of the arms on the spaced end portions 7' and 8' of the pivot pins 6' also provides the additional advantage of greatly reducing the tilting tendency of this novel pivot support.

In an alternative mode of rotation the pivot pin 6 is rotatable inside bore 5 after assembly, as shown in FIG. 3. The pin 6 is then fixedly attached to at least one of the two arms, for example, by providing the end portion 7 in the form of a riveted connection with arm 10.

According to a further suggestion of the present invention, the pivot blocks are preferably mounted on a fixed, adjustable portion of the automobile roof which includes vertical mounting lugs cooperating with the slots of the pivot block, as shown in FIG. 3, for example.

It should be understood, of course, that the foregoing disclosure describes only a preferred embodiment of the invention and that it is intended to cover all changes and modifications of this example of the invention which fall within the scope of the appended claims.

What is claimed is:

1. A pivot support for an articulated assembly such as a pivotable wind deflector on an automobile roof comprising in combination:
   a pivot block of moderately resilient material, including means for attaching it to a portion of the roof structure;
   a transverse bore in the pivot block;
   a pivot pin adapted for engagement in the bore of the pivot block, the diameter of the pivot pin defining an interference fit with the diameter of said transverse bore; and
   a transverse slot opening into the bore of the pivot block over its entire length; the slot having such a width in relation to the diameter of the pivot pin that the latter can be forcibly snapped into the bore of the pivot pin in a radial direction and is then retained therein, as a result of the resiliency of the block, said pivot pin having at least one end portion protruding axially from the pivot block and serving as a bearing support for a cooperating part of the articulated assembly.

2. A pivot support as defined in claim 1, wherein:
   the pivot support carries the rear portion of a wind deflector arranged on the roof of an automobile;
   the rear portion of the wind deflector is in the form of an arm with a fork-shaped extremity composed of two substantially parallel ears; and
   the pivot pin has a protruding end portion on each side of the pivot block, each one serving as a fixed bearing support for an ear of the wind deflector arm.

3. A pivot support as defined in claim 2, wherein:
   the pivot pin is axially retained between the ears of the wind deflector arm, at least one end portion of the pin including a retaining means which does not restrict relative rotation during pivoting.

4. A pivot support as defined in claim 2, wherein:
   the rear portion of the wind deflector is in the form of two spaced, substantially parallel arms, each being pivotally supported by a pivot block and snap-type pivot pin as mentioned.

5. A pivot support as defined in claim 1, wherein:
   the articulated assembly is a wind deflector with two spaced arms, at least one arm having a fork-shaped rear portion laterally straddling the pivot block;
   the pivot pin is rotatable inside said bore and has end portions axially protruding over the pivot block; and
   at least one pin end portion is fixedly connected to the fork-shaped rear portion of the articulated assembly.

* * * * *